Sept. 16, 1969 R. F. GRAF 3,467,828

A.C. LATCHING CIRCUIT FOR SCR HAVING PHOTORESISTIVE LATCHING

Filed Dec. 21, 1966

United States Patent Office 3,467,828
Patented Sept. 16, 1969

3,467,828

A.C. LATCHING CIRCUIT FOR SCR HAVING PHOTORESISTIVE LATCHING

Rudolf F. Graf, New Rochelle, N.Y., assignor to Sprague Electric Company, North Adams, Mass., a corporation of Massachusetts Filed Dec. 21, 1966, Ser. No. 603,555
Int. Cl. H01j 39/12
U.S. Cl. 250—214 4 Claims

ABSTRACT OF THE DISCLOSURE

A neon lamp energized with an SCR fired load, is optically coupled to a photocell in the anode-gate-circuit of the A.C. supplied SCR, such that upon initial firing of the SCR, the resistance of the cell is reduced and continuous triggering applied. In a further arrangement, another lamp and cell are optically coupled to a second SCR for switching off the latching circuit.

Background of the invention

This invention relates to silicon controlled rectifier circuits, hereinafter called SCR circuits, and more particularly to latching circuits for A.C. supplied SCR's.

In the prior art, latching of SCR's is generally accomplished by supplying the anode circuit with D.C. For example, in proximity detector circuits, or touch type circuits, if the circuit is to continue to operate after the initial triggering, latching by means of a D.C. anode supply is generally employed. This, however, requires rectification of the conventional A.C. supply and results in the application of D.C. to the load.

Summary of the invention

Broadly, a latching circuit for SCR control of electrical power from an alternating current source to a load comprises a triggering means connected to the gate of the SCR to initially fire it, and a latching means coupling the load circuit to the gate to continuously trigger the SCR upon operation of the triggering means.

In a more limited sense, the latching means includes a neon lamp, across the load, which is optically coupled to a photocell connected between the anode and gate of the SCR such that upon illumination of the cell due to load firing, a low resistance anode-gate path is provided and continuous triggering of the SCR results.

The circuit in this arrangement continues to operate until power to the neon lamp is interrupted. This interruption, which may be provided by any switch, is controlled in one embodiment by another SCR which also includes in its load circuit a neon lamp optically coupled to another photocell which, in turn, controls the latching lamp.

It is an object of this invention to provide an SCR circuit which will latch with A.C. input to the SCR.

It is another object of this invention to provide a proximity detector circuit including an A.C. energized SCR and a latching arrangement.

Description of the preferred embodiments

Figure 1:
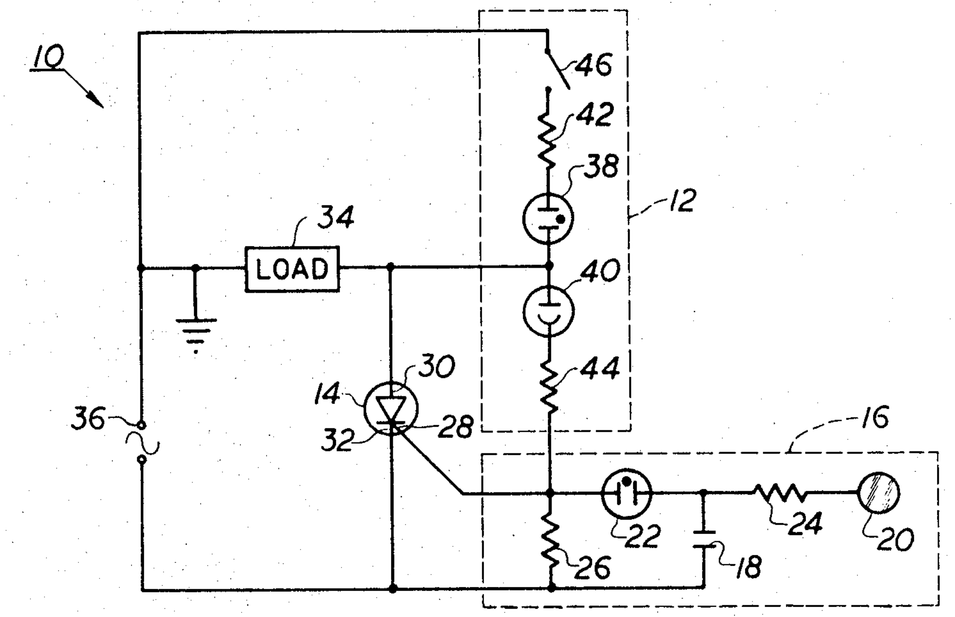
FIGURE 1 is a schematic drawing of an SCR circuit which provides latching of an SCR energized by alternating current.

Referring now to the drawing and to FIGURE 1 in particular, a proximity detector circuit 10 is shown including a latching means 12 which operates to continuously trigger the SCR 14, once the trigger circuit 16 has been activated.

Trigger circuit 16, which is a conventional proximity trigger circuit, employs a capacitor 18 and a capacitance (not shown) between the proximity, or touch, button 20 and ground as a voltage divider, such that the voltage over 18 is directly related to the ratio of both. Touching of button 20, or the bringing of a body into proximity with it (assuming the button area is sufficiently large) will increase the voltage across capacitor 18 which breaks down neon bulb 22 and discharges both capacitors through the SCR gate 28, thereby triggering SCR 14, providing a connection between anode 30 and cathode 32, and coupling load 34 to the A.C. source 36.

Since the anode-cathode circuit of SCR 14 is energized by A.C., the firing of it will cease on each negative half cycle unless continuous triggering is supplied. Thus, if the initial triggering ceases, as in the circuit shown, the SCR will stop firing unless triggering is continued by other means; or stated otherwise, unless the circuit is latched. In this case, latching means 12 is included to couple the anode 30 to gate 28 so as to supply continuous triggering once SCR 14 has been initially fired.

The latching means 12 consists of a neon lamp 38 connected across the load 34 and optically coupled to photocell 40 which is, in turn, connected from anode 30 to gate 28. In this arrangement, the cell 40 is optically coupled to the lamp 38 to provide, when illuminated by lamp 38, a low resistance path from anode to gate and thus, continuous triggering any time power is delivered to load 34.

Stated otherwise, upon triggering of the SCR 14 by the proximity triggering means 16, the SCR will fire to energize the load and neon lamp 38 which, in turn, provides a lower resistance to cell 40, such that the SCR is continuously triggered. Thus, lamp 38, which operates with the load, is utilized to latch the SCR on. It may also, of course, be visible to the operator so as to provide a signal that the circuit is operating. It should be understood, however, that for satisfactory circuit operation, cell 40 must be shielded from all extraneous light.

A resistor 42, in series with lamp 38, limits the power through the neon bulb, and a resistor 44, in series with cell 40, limits the resistance between anode 30 and gate 28. A normally closed switch 46 is also provided in series with lamp 38 to interrupt latching means 12 and shut off the circuit operation. The switch 46 may be conveniently located in any portion of the latching circuit 12 and may be mechanically, or electrically operated. It may also utilize a feedback from the load so as to switch off the circuit, after a predetermined time or upon completion of a particular operation.

Figure 2:
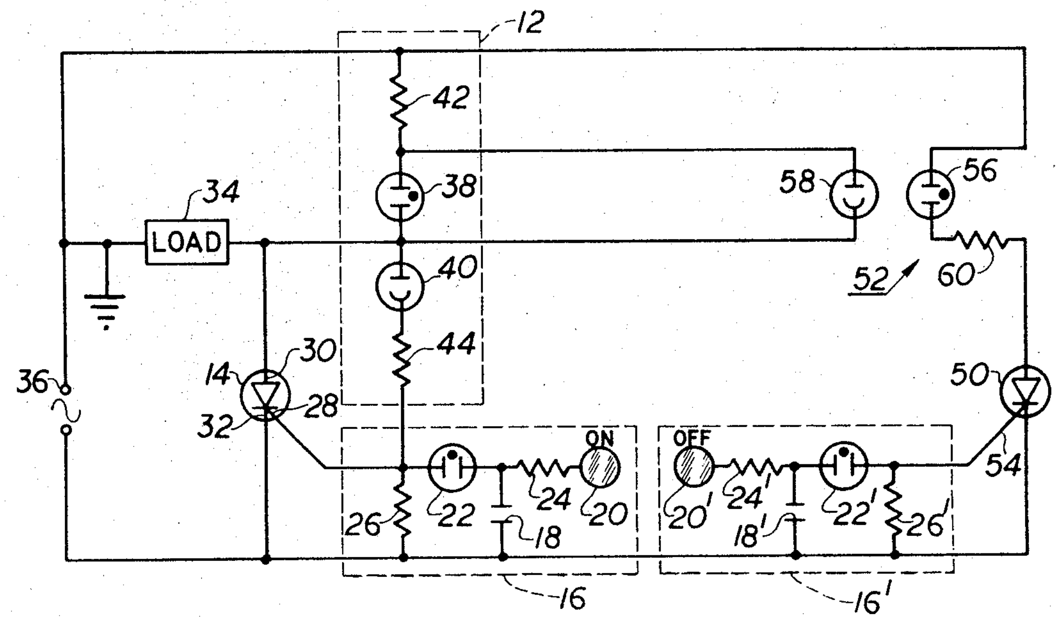
FIGURE 2 is a schematic drawing of the circuit shown in FIGURE 1 including an additional SCR branch for switching off the circuit.

The off switch may also be provided by a proximity switch, as shown in FIGURE 2, in circumstances where it is desirable to have both off and on proximity control of the circuit. As shown in this figure an additional SCR 50 is connected to a load resistance 52 and source 36. Another proximity triggering circuit 16' is employed in connection with the gate 54 to trigger it in a manner similar to that described in regard to FIGURE 1. However, in this case, it is employed to interrupt the latching circuit 12 and shut down load 34.

In this arrangement upon touching the proximity "off" button 20', SCR 50 fires and delivers power to resistor 60 and another neon lamp 56 in series with it. The lamp 56 illuminates another photocell 58 to lower its resistance, which in turn, lowers the voltage of and extinguishes latching lamp 38, and accordingly, interrupts latching circuit 12. As can be seen, cell 58 is in this instance optically coupled to lamp 56 but electrically connected across lamp 38.

For satisfactory operation, cell 40 must be shielded or optically isolated from extraneous light including lamp 56, and cell 58 from lamp 38. It should also be understood that button 20 must be sufficiently isolated from button 20′ as to preclude triggering of both at the same time.

In a typical embodiment of the circuit of FIGURE 2 the following components were employed:

| | |
|---|---|
| SCR's 14 and 50 | GEC106B1 |
| Capacitors 18 and 18′ ______ pf | 10–50 |
| Neon lamps 22, 22′, 38 and 56 | NE2 |
| Resistors 24, 24′ and 44 ______ ohms | 100K |
| Resistors 26 and 26′ ______ do | 39K |
| Photocells 40 and 58 | Clairex C903 |
| Resistors 42 and 60 ______ ohms | 47K |

Many different arrangements are possible. Thus, the latching circuit is not restricted to proximity triggering and is applicable to any SCR circuit where A.C. anode input is desirable and the initial triggering is pulse type, or not otherwise continuous.

Other types of lamps are also useful, however, the sharp cutoff of the neon lamp is desirable. Furthermore, although the proximity trigger lamps 22 or 22′ of the circuit illustrated, do not operate long enough to also provide the latching function of lamps 38 and 56 respectively, this arrangement could be provided in some circumstances.

As indicated, the latching circuit may be utilized in many different ways. Thus the circuit provides memory, since it must be switched off once it is activated. In addition, the circuit of FIGURE 2 may be employed in a flip-flop arrangement by alternately supplying trigger signals to the SCR gates.

Thus many different arrangements are possible, and while specific embodiments of the invention have been shown and described, it will be understood that the invention is to be limited only as in the appended claims.

What is claimed is:

1. A circuit for control of electrical power from an A.C. source to a load by means of an SCR having its anode and cathode connected to said load and source, said circuit comprising a pulse type triggering means connected to the gate of said SCR for initial firing thereof in response to operation of said triggering means, a latching means coupling said gate to said anode and providing a resistive anode-gate path, and said latching means operable with said SCR to provide lowered resistance of said anode gate path during said firing so as to continuously trigger said SCR upon initial firing thereof.

2. A circuit as claimed in claim 1 wherein said latching means includes a lamp coupled to said SCR and operable upon triggering thereof, and a photocell optically coupled to said lamp and connected across said anode and gate, said cell providing lower resistance between said anode and gate upon illumination thereof by said lamp and continuously triggering said SCR.

3. A circuit as claimed in claim 2 wherein said triggering means is a proximity triggering means.

4. A circuit as claimed in claim 2 wherein said circuit includes another SCR, another triggering means in connection to the gate of said other SCR, another neon lamp in the anode circuit of said other SCR, and another photocell optically coupled to said other lamp so as to provide lower resistance upon illumination thereby, said other cell connected across said first lamp so as to lower the resistance thereon and extinguish it upon triggering of said other SCR thereby switching off said latching means.

References Cited

UNITED STATES PATENTS

| | | | |
|---|---|---|---|
| 3,294,974 | 12/1966 | Riebs | 307—252 |
| 3,307,071 | 2/1967 | Diamond | 307—252 |

RALPH G. NILSON, Primary Examiner

M. ABRAMSON, Assistant Examiner

U.S. Cl. X.R.

307—252, 284; 317—130, 148.5